United States Patent
Kotani

(10) Patent No.: US 12,436,038 B2
(45) Date of Patent: Oct. 7, 2025

(54) SEMICONDUCTOR DEVICE, TEMPERATURE DETECTION SYSTEM, AND VEHICLE

(71) Applicant: ROHM CO., LTD., Kyoto (JP)

(72) Inventor: Takahiro Kotani, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 97 days.

(21) Appl. No.: 18/478,153

(22) Filed: Sep. 29, 2023

(65) Prior Publication Data
US 2024/0027282 A1 Jan. 25, 2024

Related U.S. Application Data

(63) Continuation of application No. PCT/JP2022/008816, filed on Mar. 2, 2022.

(30) Foreign Application Priority Data

Apr. 1, 2021 (JP) .................................. 2021-062761

(51) Int. Cl.
G01K 7/01 (2006.01)
H10D 84/40 (2025.01)

(52) U.S. Cl.
CPC ............. G01K 7/01 (2013.01); H10D 84/401 (2025.01)

(58) Field of Classification Search
CPC .................................................... G01K 7/01
USPC ........................................................ 327/512
See application file for complete search history.

(56) References Cited

FOREIGN PATENT DOCUMENTS

| JP | 2003149055 | | 5/2003 |
|----|------------|---|--------|
| JP | 2009139130 | | 6/2009 |
| JP | 2009139130 | A * | 6/2009 |
| JP | 2010199490 | | 9/2010 |
| JP | 2011133420 | | 7/2011 |
| JP | 2011133420 | A * | 7/2011 |
| JP | 2014098614 | | 5/2014 |
| JP | 2014098614 | A * | 5/2014 |

OTHER PUBLICATIONS

International Search Report and Written Opinion in International Appln. No. PCT/JP2022/008816, mailed on May 17, 2022, 14 pages (with machine translation).

* cited by examiner

Primary Examiner — Tomi Skibinski
(74) Attorney, Agent, or Firm — Fish & Richardson P.C.

(57) ABSTRACT

A semiconductor device includes a power element, a drive circuit configured to drive the power element, and a temperature detection circuit configured to be capable of detecting a temperature of 0° C. or lower. The temperature detection circuit is configured to generate and output, based on a voltage signal that is temperature-temperature, a detection signal having a lower temperature-dependent change rate than the voltage signal.

11 Claims, 4 Drawing Sheets

SEMICONDUCTOR DEVICE, TEMPERATURE DETECTION SYSTEM, AND VEHICLE

CROSS-REFERENCE TO RELATED APPLICATIONS

This nonprovisional application is a continuation application of International Patent Application No. PCT/JP2022/008816 filed on Mar. 2, 2022, which claims priority Japanese Patent Application No. 2021-062761 filed in Japan on Apr. 1, 2021, the entire contents of which are hereby incorporated by reference.

BACKGROUND OF THE INVENTION

1. Technical Field

The invention disclosed herein relates to a semiconductor device, a temperature detection system, and a vehicle.

2. Description of Related Art

Conventionally, various types of semiconductor devices called IPM (Intelligent Power Module) have been developed. An IPM includes a power element and a drive circuit configured to drive the power element. A power element generates heat during its operation, and thus some IPMs have built therein a temperature detection circuit configured to detect the ambient temperature of the power element.

DETAILED DESCRIPTION

Figure 1:
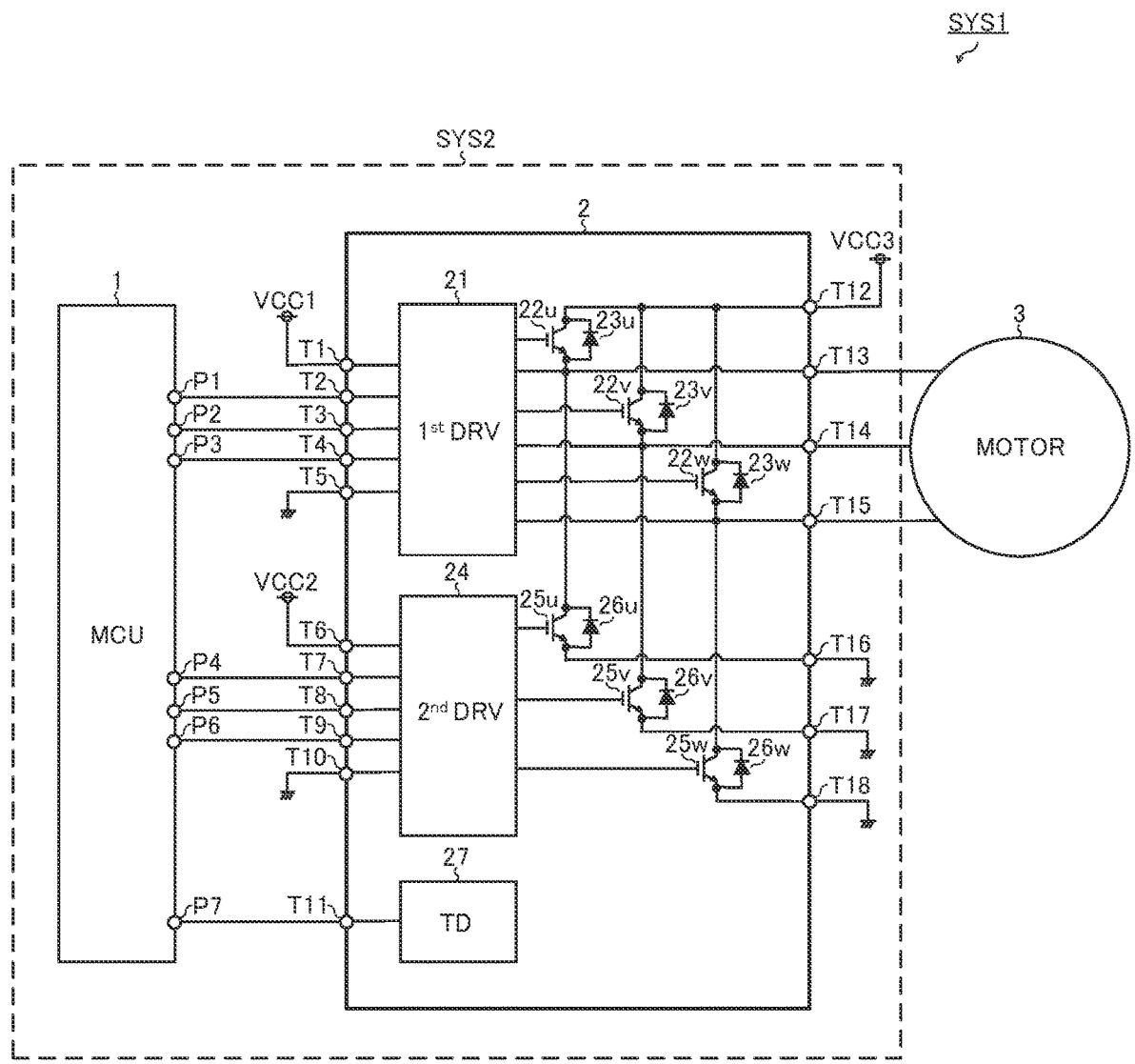
FIG. 1 is a diagram showing a schematic configuration of a motor control system according to an embodiment.

FIG. 1 is a diagram showing a schematic configuration of a motor control system according to an embodiment. The motor control system SYS1 shown in FIG. 1 includes an MCU (Micro Controller Unit) 1, an IPM 2, and a three-phase motor 3. The MCU 1 is an example of a computer. The IPM 2 is an example of a semiconductor device. In the present embodiment, it is the motor that is connected to the semiconductor device as a load, but it does not mean to limit the load connected to the semiconductor device to a motor.

The motor control system SYS1 includes a temperature detection system SYS2. The temperature detection system SYS2 includes the MCU 1 and the IPM 2.

The MCU 1 includes first to seventh ports P1 to P7. The first to sixth ports P1 to P6 are digital output ports configured to output first to sixth control signals therefrom, respectively, which are each a digital voltage signal such as a PWM (Pulse Width Modulation) control signal. The seventh port P7 is an analog input port configured to input an analog voltage signal thereto.

The IPM 2 includes first to eighteenth terminals T1 to T18.

The first terminal T1 is configured to input a first power supply voltage VCC1 thereto. The second to fourth terminals T2 to T4 are configured to input thereto the above-described first to third control signals, respectively. The fifth terminal T5 is configured to be connected to a ground potential.

The sixth terminal T6 is configured to input a second power supply voltage VCC2 thereto. The seventh to ninth terminals T7 to T9 are configured to input thereto the above-described fourth to sixth control signals, respectively. The tenth terminal T10 is configured to be connected to the ground potential.

The eleventh terminal T11 is configured to output therefrom an output signal (detection signal) VOT of a temperature detection circuit 27 which will be described later. The eleventh terminal T11 of the IPM 2 and the seventh port P7 of the MCU 1 are connected to each other via a connection line alone. In other words, between the eleventh terminal T11 of the IPM 2 and the seventh port P7 of the MCU 1, no conversion circuit exists for converting the output signal VOT of the temperature detection circuit 27, which will be described later. In the temperature detection system SYS2, there is no need to provide a plurality of conversion circuits for converting the output signal VOT of the temperature detection circuit 27, and thus, with fewer components, it is possible to achieve compactness and low cost.

The twelfth terminal T12 is configured to input a third power supply voltage VCC3. The thirteenth terminal T13 is configured to be connected to a U-phase terminal of the three-phase motor 3. The fourteenth terminal T14 is configured to be connected to a V-phase terminal of the three-phase motor 3. The fifteenth terminal T15 is configured to be connected to a W-phase terminal of the three-phase motor 3. The sixteenth to eighteenth terminals T16 to T18 may be configured to be connected to the ground potential as shown in FIG. 1, for example, or may be configured to be connected to the ground potential via a filter circuit, for example.

The first to third power supply voltages VCC1 to VCC3 are each a direct-current voltage. The first to third power supply voltages VCC1 to VCC3 may be voltages having different values, or at least two of them may be voltages having the same value.

The IPM 2 further includes a first drive circuit 21, IGBTs ((Insulated Gate Bipolar Transistors) 22*u*, 22*v*, and 22*w*, and diodes 23*u*, 23*v* and 23*w*. In the present embodiment, it is the IGBTs that are provided in the semiconductor device as power elements, power elements other than IGBTs may be provided in the semiconductor device.

The first drive circuit 21 is connected, inside the IPM 2 to the first to fifth terminals T1 to T5. The first drive circuit 21 operates with a voltage between the first power supply voltage VCC1 and the ground potential. The first drive circuit 21 generates a first drive signal based on a first control signal input to the second terminal T2, and feeds the first drive signal to a gate of the IGBT 22*u*. The first drive circuit 21 generates a second drive signal based on a second control signal input to the third terminal T3, and feeds the second drive signal to a gate of the IGBT 22*v*. The first drive circuit 21 generates a third drive signal based on a third control signal input to the fourth terminal T4, and feeds the third drive signal to a gate of the IGBT 22*w*.

Collectors of the IGBTs 22*u*, 22*v* and 22*w* and cathodes of the diodes 23*u*, 23*v* and 23 are, inside the IPM 2, connected to the twelfth terminal T12. An emitter of the IGBT 22*u* and an anode of the diode 23*u* are, inside the IPM 2, connected to the thirteenth terminal T13. An emitter of the IGBT 22*v* and an anode of the diode 23*v* are, inside the IPM 2, connected to the fourteenth terminal T14. An emitter of the IGBT 22w and an anode of the diode 23w are, inside the IPM 2, connected to the fifteenth terminal T15.

The IPM 2 further includes a second drive circuit 24, IGBTs 25u, 25v and 25w, and diodes 26u, 26v and 26w.

The second drive circuit 24 is, inside the IPM 2, connected to the sixth to tenth terminals T6 to T10. The second drive circuit 24 operates with a voltage between the second power supply voltage VCC2 and the ground potential. The second drive circuit 24 generates a fourth drive signal based on a fourth control signal input to the seventh terminal T7, and feeds the fourth drive signal to a gate of the IGBT 25u. The second drive circuit 24 generates a fifth drive signal based on a fifth control signal input to the eighth terminal T8, and feeds the fifth drive signal to a gate of the IGBT 25v. The second drive circuit 24 generates a sixth drive signal based on a sixth control signal input to the ninth terminal T9, and feeds the sixth drive signal to a gate of the IGBT 25w.

A collector of the IGBT 25u and a cathode of the diode 26u are, inside the IPM 2, connected to the thirteenth terminal T13. An emitter of the IGBT 25u and an anode of the diode 26u are, inside the IPM 2, connected to the sixteenth terminal T16. A collector of the IGBT 25v and a cathode of the diode 26v are, inside the IPM 2, connected to the fourteenth terminal T14. An emitter of the IGBT 25v and an anode of the diode 26v are, inside the IPM 2, connected to the seventeenth terminal T17. A collector of the IGBT 25w and a cathode of the diode 26w are, inside the IPM 2, connected to the fifteenth terminal T15. An emitter of the IGBT 25w and an anode of the diode 26w are, inside the IPM 2, connected to the eighteenth terminal T18.

The IPM 2 further includes the temperature detection circuit 27.

The temperature detection circuit 27 is configured to be capable of detecting a temperature of 0° C. or lower. Thus, the temperature detection circuit 27 can detect an internal temperature of the IPM 2 at startup in a cold region, for example. That is, the IPM 2 can detect, in a wide range of usage environments, the internal temperature of the IPM 2 when the IPM 2 is started up. In the present embodiment, the temperature detection circuit 27 is configured to output, on detecting the temperature of 0° C., the output signal VOT having a positive value. This makes it possible to use a general-purpose device (such as a general-purpose computer) as an external device for processing the detection signal output from the temperature detection circuit, and thus to process, by means of the general-purpose device, the detection signal output when the temperature of 0° C. has been detected.

It is preferable that the temperature detection circuit 27 be configured to be capable of detecting the temperature of −25° C. This is because, if the temperature detection circuit 27 can detect the temperature of −25° C., the temperature detection circuit 27 can detect the internal temperature of the IPM 2 at startup even in winter in most of cold regions in Japan, for example. In this case, the temperature detection circuit 27 can be configured to output the output signal VOT having a positive value on detecting the temperature of −25° C.

It is further preferable that the temperature detection circuit 27 be configured to be capable of detecting the temperature of −40° C. This is because, if the temperature detection circuit 27 can detect the temperature of −40° C., the temperature detection circuit 27 can detect the internal temperature of the IPM 2 at startup even in winter in most of the cold regions all over the world, for example. In that case, the temperature detection circuit 27 can be configured to output the output signal VOT having a positive value on detecting the temperature of −40° C.

The temperature detection circuit 27 is configured to be capable of detecting the temperature of 150° C. Thus, the temperature detection circuit 27 can detect the internal temperature of the IPM 2 even when the IGBTs 22u, 22v, 22w, 25u, 25v, and 25w have generated heat to raise the internal temperature of the IPM 2.

The temperature detection circuit 27 is configured not to include a thermistor. Thus, the IPM 2 includes a single terminal configured to output therefrom the output signal VOT of the temperature detection circuit 27. The IPM 2 does not need to include two or more terminals configured to output therefrom the output signal VOT of the temperature detection circuit 27, and thus it is possible to achieve compactness and low cost.

It is preferable that the temperature detection circuit 27 be entirely constituted of integrated circuits. With the entire temperature detection circuit 27 constituted of integrated circuits, it is possible to achieve compactness and low cost of the temperature detection circuit 27.

Figure 2:
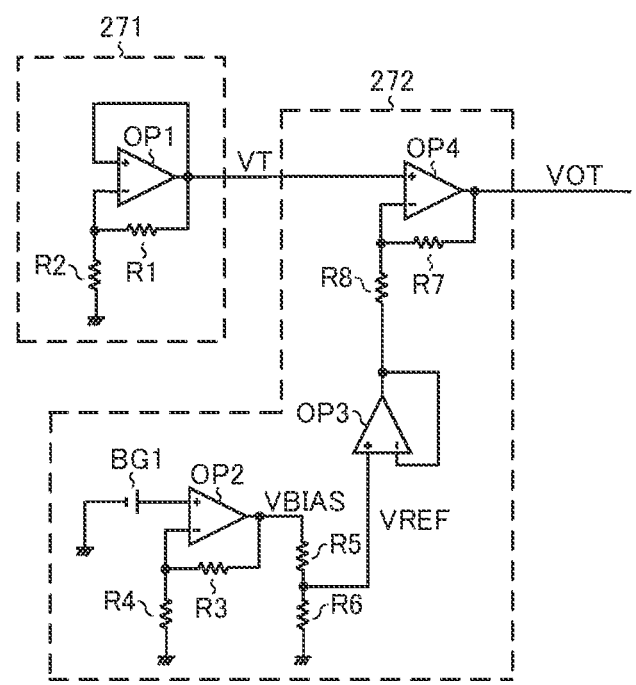
FIG. 2 is a diagram showing one configuration example of a temperature detection circuit.

FIG. 2 is a diagram showing a configuration example of the temperature detection circuit 27. The temperature detection circuit 27 shown in FIG. 2 includes a voltage signal generation circuit 271 and a conversion circuit 272.

The voltage signal generation circuit 271 is configured to generate a voltage signal VT that is temperature-dependent. The voltage signal generation circuit 271 includes an operational amplifier OP1 and resistors R1 and R2. A non-inverting input terminal of the operational amplifier OP1 is connected to an output terminal of the operational amplifier OP1. An inverting input terminal of the operational amplifier OP1 is connected, via the resistor R1, to the output terminal of the operational amplifier OP1. Further, the inverting input terminal of the operational amplifier OP1 is connected, via the resistor R2, to the ground potential. An input stage of the operational amplifier OP1 is constituted of differential pair transistors having different threshold voltages from each other. The voltage signal VT has a temperature-dependent change rate (a temperature coefficient) that is substantially constant in a temperature detection range (−40° C. or higher but 150° C. or lower) of the temperature detection circuit 27.

The conversion circuit 272 is configured to convert the voltage signal VT into the output signal VOT. The conversion circuit 272 includes a bandgap-type reference voltage generation circuit BG1, operational amplifiers OP2 to OP4, and resistors R3 to R8.

The bandgap-type reference voltage generation circuit BG1 is a direct-current voltage supply that uses a bandgap voltage to generate a reference voltage that changes little with temperature, and outputs the reference voltage. A negative pole of the bandgap-type reference voltage generation circuit BG1 is connected to the ground potential.

A positive pole of the bandgap-type reference voltage generation circuit BG1 is connected to a non-inverting input terminal of the operational amplifier OP2. That is, from the bandgap-type reference voltage generation circuit BG1 to the non-inverting input terminal of the operational amplifier OP2, the reference voltage is fed.

An inverting input terminal of the operational amplifier OP2 is connected, via the resistor R3, to an output terminal of the operational amplifier OP2. Further, the inverting input terminal of the operational amplifier OP2 is connected, via the resistor R4, to the ground potential. A bias voltage VBIAS that changes little with temperature is output from the output terminal of the operational amplifier OP2.

The bias voltage VBIAS is divided by the resistors R5 and R6. The voltage obtained by dividing the bias voltage VBIAS is fed to a non-inverting input terminal of the operational amplifier OP3. An inverting input terminal of the operational amplifier OP3 is connected to an output terminal of the operational amplifier OP3. The bandgap-type reference voltage generation circuit BG1, the operational amplifier OP2, and the resistors R3 to R5 constitute a direct-current bias voltage supply portion. The operational amplifier OP3 constitutes a voltage follower circuit. A direct-current bias voltage VREF from the direct-current bias voltage supply portion is fed, via the voltage follower circuit, to a voltage feedback-type operational amplifier, which will be described later.

The output terminal of the operational amplifier OP3 is connected, via the resistor R8, to an inverting input terminal of the operational amplifier OP4. Further, the inverting input terminal of the operational amplifier OP4 is connected, via the resistor R7, to an output terminal of the operational amplifier OP4. From the output terminal of the operational amplifier OP4, the output signal VOT of the temperature detection circuit 27 is output. The operational amplifier OP4, the resistor R7, and the resistor R8 constitute the voltage feedback-type operational amplifier.

Figure 3:
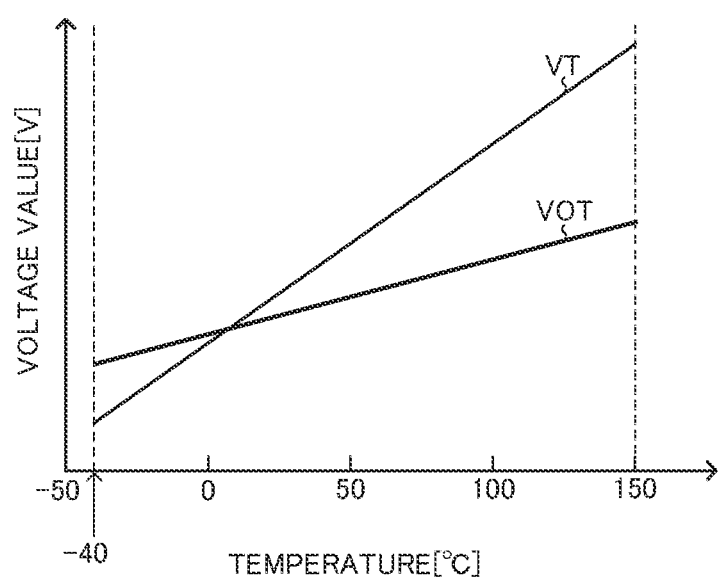
FIG. 3 is a graph showing temperature characteristics of a voltage signal and of an output signal.

FIG. 3 is a graph showing temperature characteristics of the voltage signal VT and of the output signal VOT of the temperature detection circuit 27. A horizontal axis shown in FIG. 3 indicates temperature. A vertical axis shown in FIG. 3 indicates signal voltage value.

As shown in FIG. 3, the output signal VOT of the temperature detection circuit 27 has a lower temperature-dependent change rate (temperature coefficient) than the voltage signal VT. More specifically, in the temperature detection range (−40° C. or higher but 150° C. or lower) of the temperature detection circuit 27, the temperature-dependent change rate (the temperature coefficient) of the output signal VOT of the temperature detection circuit 27 is smaller than the temperature-dependent change rate (the temperature coefficient) of the voltage signal VT.

Here, in the temperature detection range (−40° C. or higher but 150° C. or lower) of the temperature detection circuit 27, the temperature-dependent change rate (the temperature coefficient) of the output signal VOT of the temperature detection circuit 27 is substantially constant in value, and the temperature-dependent change rate (the temperature coefficient) of the voltage signal VT is also substantially constant. Thus, if, at a typical temperature (e.g., 25° C.) within the temperature detection range (−40° C. or higher but 150° C. or lower) of the temperature detection circuit 27, the temperature-dependent change rate (the temperature coefficient) of the output signal VOT of the temperature detection circuit 27 is lower than the temperature-dependent change rate (the temperature coefficient) of the voltage signal VT, it can be considered that the temperature-dependent change rate (the temperature coefficient) of the output signal VOT of the temperature detection circuit 27 is lower than that of the voltage signal VT in the whole temperature detection range (−40° C. or higher but 150° C. or lower) of the temperature detection circuit 27.

By adjusting a circuit constant of the conversion circuit 272, the temperature-dependent change rate (the temperature coefficient) of the output signal VOT of the temperature detection circuit 27 can be adjusted, and further, a position of an intersection point of the output signal VOT of the temperature detection circuit 27 and the voltage signal VT in the graph shown in FIG. 3 can also be adjusted.

The temperature detection circuit 27 shown in FIG. 2 is configured to include the voltage signal generation circuit 271 and the conversion circuit 272 described above, and this makes it easy to adjust a voltage-value range of the output signal VOT of the temperature detection circuit 27 in the temperature detection range (−40° C. or higher but 150° C. or lower) of the temperature detection circuit 27.

Further, since the temperature-dependent change rate (the temperature coefficient) of the output signal VOT of the temperature detection circuit 27 is lower than the temperature-dependent change rate (the temperature coefficient) of the voltage signal VT, it is possible to narrow the voltage-value range of the output signal VOT of the temperature detection circuit 27 in the temperature detection range (−40° C. or higher but 150° C. or lower) of the temperature detection circuit 27. Thus, even if the temperature detection range (−40° C. or higher but 150° C. or lower) of the temperature detection circuit 27 is wide, it is possible, as in the present embodiment, for example, to feed the output signal VOT of the temperature detection circuit 27 directly to an analog input port of a computer.

There is no particular limitation to devices or apparatuses in which the IPM 2 is to be mounted, but the IPM 2 is useful particularly when mounted in a device or an apparatus used in an environment with significant temperature change.

Figure 4:
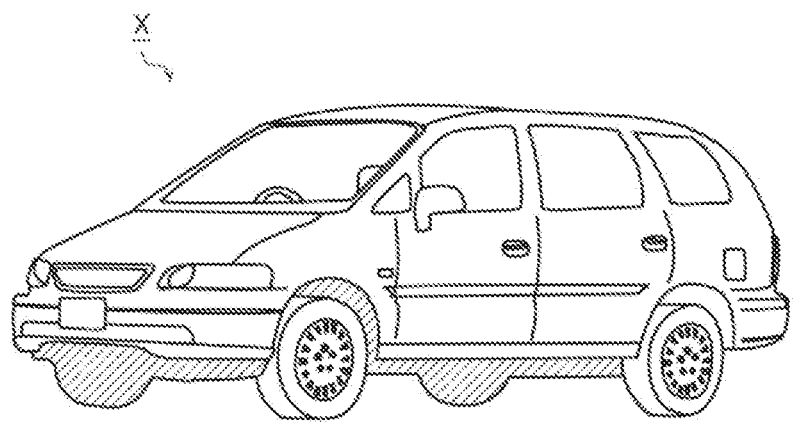
FIG. 4 is an external view of a vehicle according to an embodiment.

The motor control system SYS1 shown in FIG. 1 can be mounted in a vehicle X shown in FIG. 4, for example. In a case where the motor control system SYS1 shown in FIG. 1 is mounted in the vehicle X, the three-phase motor 3 can be, for example, a motor provided inside a compressor that is a component of an in-vehicle air conditioner. For example, the MCU 1 can determine, based on the output signal VOT of the temperature detection circuit 27, whether or not the internal temperature of the IPM 2 is equal to or higher than a lower limit temperature at which the compressor can be started up without any problem.

Noted that the present invention can be implemented with any other configuration than that of the embodiment described above, with various modifications made without departure from the spirit of the present invention. It should be understood that the foregoing embodiment is not limitative but illustrative in every respect. The technical scope of the present invention is not determined by the foregoing embodiment but by the claims, and should be construed to include all modifications equivalent in meaning and scope to the claims.

The hitherto discussed semiconductor device (2) includes a power element (22u, 22v, 22w, 25u, 25v, 25w), a drive circuit (21, 24) configured to drive the power element, and a temperature detection circuit (27) configured to be capable of detecting a temperature of 0° C. or lower. Here, the temperature detection circuit is configured to generate and output, based on a voltage signal that is temperature-dependent, a detection signal that has a lower temperature-dependent change rate than the voltage signal (a first configuration).

The semiconductor device according to the first configuration described above is capable of detecting an internal temperature of the semiconductor device at startup in a cold region, for example. That is, the semiconductor device according to the first configuration described above is capable of detecting the internal temperature of the semiconductor device at startup in a wide range of usage environments.

In the semiconductor device according to the first configuration described above, the temperature detection circuit may be configured to output, on detecting a temperature of 0° C., the detection signal having a positive value (a second configuration).

With the semiconductor device according to the second configuration described above, a general-purpose device (e.g., a general-purpose computer) can be used as an external device that processes the detection signal output from the temperature detection circuit, and the general-purpose device can process the detection signal output when the temperature of 0° C. is detected.

In the semiconductor device according to the second configuration described above, the temperature detection circuit may be configured to output, on detecting a temperature of −25° C., the detection signal having a positive value (a third configuration).

The semiconductor device according to the third configuration described above can detect the internal temperature of the semiconductor device at startup even in the winter season in most of the cold regions in Japan, for example.

In the semiconductor device according to the third configuration described above, the temperature detection circuit may be configured to output, on detecting a temperature of −40° C., the detection signal having a positive value (a fourth configuration).

The semiconductor device according to the fourth configuration described above can detect the internal temperature of the semiconductor device at startup even in the winter season in most of the cold regions all over the world, for example.

The semiconductor device according to any one of the first to fourth configurations described above may be configured to include a single terminal configured to output the detection signal therefrom (a fifth configuration).

In the semiconductor device according to the fifth configuration described above, the number of terminals can be reduced, and thus it is possible to achieve compactness and low cost.

In the semiconductor device according to any one of the first to fifth configurations described above, the temperature detection circuit may be configured to include a voltage signal generation circuit (271) configured to generate the voltage signal and a conversion circuit (272) configured to convert the voltage signal into the detection signal (a sixth configuration).

The semiconductor device according to the sixth configuration described above can easily adjust the voltage-value range of the detection signal in the temperature detection range of the temperature detection circuit. Further, the semiconductor device according to the sixth configuration described above can narrow the voltage-value range of the detection signal in the temperature detection range of the temperature detection circuit.

In the semiconductor device according to the sixth configuration described above, the conversion circuit may be configured to include a voltage feedback-type operational amplifier, such that the voltage signal is input to the voltage feedback-type operational amplifier, and that the detection signal is output from the voltage feedback-type operational amplifier (a seventh configuration).

The semiconductor device according to the seventh configuration described above can, with a simple circuit configuration, accomplish the conversion of the voltage signal into the detection signal.

In the semiconductor device according to the seventh configuration described above, the conversion circuit may be configured to include a direct-current bias voltage supply portion configured to feed the voltage feedback-type operational amplifier with a direct-current bias voltage (an eighth configuration).

The semiconductor device according to an eighth configuration can, with a simple circuit configuration, adjust the value of the detection signal.

In the semiconductor device according to the eighth configuration described above, the conversion circuit may be configured to include a voltage follower circuit provided between the voltage feedback-type operational amplifier and the direct-current bias voltage supply portion (a ninth configuration).

In the semiconductor device according to the ninth configuration, the voltage characteristics in the conversion circuit can be improved.

The temperature detection system (SYS2) discussed hitherto is configured to include the semiconductor device according to any one of the first to ninth configurations described above and a computer (1) that includes an analog input port (P7) configured to input an analog voltage signal thereto (a tenth configuration).

The temperature detection system according to the tenth configuration described above can detect the internal temperature of the semiconductor device at startup in a cold region, for example. That is, the temperature detection system according to the tenth configuration described above can detect the internal temperature of the semiconductor device at startup in a wide range of usage environments. Further, there is no need to provide a conversion circuit between a terminal of the temperature detection circuit and the analog input port of the computer, and thus it is possible to achieve compactness and low cost.

The vehicle (X) discussed hitherto is configured to include the semiconductor device according to any one of the first to ninth configurations described above (an eleventh configuration).

The vehicle according to the eleventh configuration described above can detect the internal temperature of the semiconductor device at startup in a cold region, for example. That is, the vehicle according to the eleventh configuration described above can detect the internal temperature of the semiconductor device at startup in a wide range of usage environments.

The invention claimed is:

1. A semiconductor device, comprising:
   a power element;
   a drive circuit configured to drive the power element; and
   a temperature detection circuit configured to be capable of detecting a temperature of 0° C. or lower,
   wherein
   the temperature detection circuit is configured to generate and output, based on a voltage signal that is temperature-dependent, a detection signal that has a lower temperature-dependent change rate than the voltage signal, and
   the temperature-dependent change rate of the detection signal is an absolute value of an amount of change in the detection signal with respect to an amount of change in temperature, and the temperature-dependent change rate of the voltage signal is an absolute value of an amount of change in the voltage signal with respect to the amount of change in temperature.

2. The semiconductor device according to claim 1, wherein
   the temperature detection circuit is configured to output, on detecting a temperature of 0° C., the detection signal having a positive value.

3. The semiconductor device according to claim 2, wherein
the temperature detection circuit is configured to output, on detecting a temperature of −25° C., the detection signal having a positive value.

4. The semiconductor device according to claim 3, wherein
the temperature detection circuit is configured to output, on detecting a temperature of −40° C., the detection signal having a positive value.

5. The semiconductor device according to claim 1, wherein
the semiconductor device includes a single terminal configured to output the detection signal therefrom.

6. The semiconductor device according to claim 1, wherein
the temperature detection circuit includes
   a voltage signal generation circuit configured to generate the voltage signal and
   a conversion circuit configured to convert the voltage signal into the detection signal.

7. The semiconductor device according to claim 6, wherein
the conversion circuit includes a voltage feedback-type operational amplifier,
the voltage signal is input to the voltage feedback-type operational amplifier, and
the detection signal is output from the voltage feedback-type operational amplifier.

8. The semiconductor device according to claim 7, wherein
the conversion circuit includes a direct-current bias voltage supply portion configured to feed the voltage feedback-type operational amplifier with a direct-current bias voltage.

9. The semiconductor device according to claim 8, wherein
the conversion circuit includes a voltage follower circuit provided between the voltage feedback-type operational amplifier and the direct-current bias voltage supply portion.

10. A temperature detection system, comprising:
the semiconductor device according to claim 1; and
a computer including an analog port configured to input an analog voltage signal thereto.

11. A vehicle comprising the semiconductor device according to claim 1.

* * * * *